United States Patent [19]

Camp, Jr. et al.

[11] Patent Number: 5,179,725
[45] Date of Patent: Jan. 12, 1993

[54] VOLTAGE CONTROLLED OSCILLATOR WITH CORRECTION OF TUNING CURVE NON-LINEARITIES

[75] Inventors: William O. Camp, Jr., Ithaca; Dale E. Del Nero, Vestal, both of N.Y.; Charles N. Herbert, Rome, Pa.; John A. Marozas, Colchester, Vt.

[73] Assignee: International Business Machines, Armonk, N.Y.

[21] Appl. No.: 677,223

[22] Filed: Mar. 29, 1991

[51] Int. Cl.$^5$ ............................................. H04B 7/00
[52] U.S. Cl. .............................. 455/164.2; 455/260.1; 455/264
[58] Field of Search ............... 455/264, 259, 161, 164, 455/260, 265, 164.2, 164.1, 161.1, 161.2, 161.3, 161.4

[56] References Cited

U.S. PATENT DOCUMENTS

| | | | |
|---|---|---|---|
| 4,077,008 | 2/1978 | Rast et al. | 325/421 |
| 4,078,212 | 3/1978 | Rast | 325/421 |
| 4,198,604 | 4/1980 | Holdaway | 455/259 |
| 4,641,101 | 2/1987 | Selim | 328/25 |
| 4,719,649 | 1/1988 | Woodsum | 455/1 |
| 4,728,906 | 3/1988 | Turl et al. | 331/4 |
| 4,823,399 | 4/1989 | George | 455/192 |
| 4,921,467 | 5/1990 | Lax | 455/264 |
| 5,029,181 | 7/1991 | Endo | 375/1 |

Primary Examiner—Reinhard J. Eisenzopf
Assistant Examiner—Christine K. Belzer
Attorney, Agent, or Firm—Lynn L. Augspurger

[57] ABSTRACT

A scanning-superhetrodyne ESM receiver having a VCO for a local oscillator which is linearized and temperature compensated. A stable combline oscillator is used to generate known frequency signals which are frequency converted to an intermediate frequency (IF) using the local oscillator and frequency converter(-mixer). The frequency of each combline signal is measured and a table of known voltage/frequency points is generated. The table is input to a Cubic Spline program which computes the coefficients for the best-fit third order polynomial for each pair of data points. When a particular local oscillator frequency is desired, the corresponding tune voltage is computed by solving the polynomial equation for the given frequency range. By repeating the calibration on a periodic, or an "as needed." basis, temperature compensation is achieved.

19 Claims, 4 Drawing Sheets

PSEUDOCODE FOR CUBIC SPLINE FIT TO TRANSFER CURVE

SET OF TUNE VOLTAGES AND FREQUENCIES,
    FREQUENCIES NOT NECESSARILY EVENLY SPACED.

| NUMBER | TUNE_VOLTAGE | FREQUENCY |
|---|---|---|
| n = 0 | V[0] | F[0] |
| 1 | V[1] | F[1] |
| 2 | V[2] | F[2] |
| . | . | . |
| N | V[N] | F[N] |

GENERATES 4 SETS OF COEFFICIENTS  C[i] [NUMBER]

TO USE:

INPUT FREQUENCY
LOOP n FROM 0 TO N
    EXIT WHEN F[n] > OR = FREQUENCY
CALCULATE TUNE_VOLTAGE= C[1] [n] + (FREQUENCY − F[n]) *
                       (C[2] [n] + (FREQUENCY − F[n]) *
                       (C[3] [n] + (FREQUENCY − F[n]) *
                        C[4] [n]))

TO CALCULATE C's:

LOOP NUMBER FROM 0 TO N
    CALCULATE C[1][NUMBER] = V[NUMBER]
    /* END POINT SLOPE = PIECEWISE BESSEL INTERPOLATION */
    /* EQUIVALENT TO CONSTANT 2nd DERIVATIVE            */

FIG.3A

```
CALCULATE C[2] [0] = (((F[2]-F[0])*(V[1]-V[0])/(F[1]-F[0])-
                      (F[1]-F[0])*(V[2]-V[0])/(F[2]-F[0]))/(F[2]-F[1])

CALCULATE C[2] [N] = SIMILAR
/* THE FOLLOWING IS A SERIES OF LOOPS WITH INTERMEDIATE CALCULATIONS */
/* MODIFIED GAUSS ELIMINATION SCHEME                                 */
/* MAKES USE OF TEMPORARY VECTORS DIFF AND DIAG                      */
SET DIFF[0] = 0;
SET DIAG[0] = 1;
LOOP n FROM 1 TO Nt CALCULATE
    DIFF[n] = F[n]-F[n-1]
    DIAG[n] = (C[1,n]-C[1,n-1])/DIFF[n]
LOOP n FROM 1 TO Nt-1 CALCULATE
    C[2,n] = 3*DIFF[n]*DIAG[n+1]+3*DIFF[n+1]*DIAG[n]
    DIAG[n] = 2*DIFF[n]+2*DIFF[n+1]
LOOP n FROM 1 to Nt-1 CALCULATE
    g = -DIFF[n+1]/DIAG[n-1]
    DIAG[n] = DIAG[n]+g*DIFF[n-1]
    C[2,n] = C[2,n]+g*C[2,n-1]
LOOP n FROM Nt-2 TO 1 CALCULATE
    C[2,n] = (C[2,n]-DIFF[n]*C[2,n+1])/DIAG[n]
LOOP n FROM 0 TO (Nt-1) CALCULATE
    C[3,n] = (C[2,n+1]+2*C[2n]-3*(C[1,n+1]-C[1,n])/(F[n+1]-F[n])/(F[n+1]-F[n])
    C[4,n] = (C[2,n]+C[2,n+1]-2*(C[1,n+1]-C[1,n])/(F[n+1]-F[n]))/((F[n+1]-F[n])**2
```

*FIG.3B*

| FIG.3A |
|--------|
| FIG.3B |

*FIG.3*

VOLTAGE CONTROLLED OSCILLATOR WITH CORRECTION OF TUNING CURVE NON-LINEARITIES

FIELD OF THE INVENTION

This invention relates to voltage controlled oscillators, and particularly to a voltage controlled oscillator which is useful for ESM (Electronic Support Measures) receivers where both linearization and temperature compensation of the tune voltage input/frequency output transfer function are important considerations.

BACKGROUND OF THE INVENTION

Voltage controlled oscillators (VCO) generally have a non-linear tuning characteristic, which means that the transfer function between the tune voltage input and frequency output is non-linear. This tuning characteristic is commonly linearized and temperature compensated using PROMs (Programmable Read Only Memories).

An ESM receiver is often a scanning superheterodyne type receiver which is used to intercept and derive information from RF and microwave signals.

Most ESM Receivers require one or more VCOs to provide the function of the local oscillator. These systems require the voltage input/frequency output transfer function to be linearized and temperature compensated. This function has been traditionally implemented with PROMs or breakpoint generators. This is expensive in terms of hardware cost, testing time, and does not work if some component characteristic drifts with age. In addition, if a certain components within the VCO fail, the calibration data in the PROM becomes invalid. New linearization and temperature compensation data must be retaken and input to the PROM.

The use of programmed control of a VCO with a varactor tuned filter has been illustrated in a number of U.S. Patents. U.S. Pat. No. 4,641,101, issued Feb. 3, 1987, to Harold N. Selim provided a VCO with a programmable tuner which generated voltages for two voltage dividers. A tuning curve was programmed in a RAM (Random Access Memory) with tuning voltage data values stored in memory to cause the dividers to follow the input. There the VCO tuning voltage was quantitized into sixteen steps.

This may be contrasted with the approach of shaping networks and PROMs incorporated into microprocessor controlled signal generators mentioned, along with thermistors for temperature correction, in U.S. Pat. No. 4,728,906, issued Mar. 1, 1988 to Turl et al. That patent controlled a varactor-tuned oscillator by using look-up tables for fine tuning with a program for a microprocessor to perform the various frequency establishing steps and calibration steps of the apparatus.

Microcomputers have been used to measure the frequency of an output from a VCO, as illustrated by U.S. Pat. No. 4,823,399 issued Apr. 18, 1989 to Ashok K. George.

Programmed tuning has been used in tuning television oscillators, as illustrated by the U.S. Patents to Rast et al., U.S. Pat. Nos. 4,078,212 issued Mar. 7, 1978 and 4,997,008.

The aforesaid programatical and hardware approaches are an expensive solution to linearizing a VCO throughout its frequency range and requires additional elements to handle temperature compensation.

SUMMARY OF THE INVENTIONS

Linearization and temperature compensation of a voltage controlled oscillator (VCO) may be accomplished using a stable combline or harmonic oscillator for generating known frequencies throughout the VCO tuning range, reducing not only the component cost but the time required for tuning. This solution provides a more suitable approach where an ESM system is involved, since a combline oscillator used in accordance with the preferred embodiment of the inventions may be already used for calibration and built-in-test (BIT) and does not constitute additional hardware.

The VCO tune voltage is adjusted under microprocessor control such that each combline frequency is sequentially down-converted to the center of the intermediate frequency (IF) passband of the receiver. Temporary data is collected on the VCO frequency and tune voltage.

The temporary data is utilized as input to the microprocessor and in accordance with our preferred embodiment the non-linear tuning function is characterized with a third order polynomial, and this is repeated often enough that temperature compensation is not required. A Cubic Spline program is used to calibrate a specific desired frequency and the coefficients for the particular frequency range are used to generate a polynonomial equation which is solved to determine the corresponding tuning voltage. This permits implementation of temperature compensation by rapid repetition of the complete calibration process when it is determined that the VCO tuning curve has drifted significantly from a previous calculation.

In accordance with the preferred embodiment of our inventions the drift is detected by periodically comparing the tune voltages corresponding to the combline frequencies to the tune voltages for the same comblines frequencies calculated during the previous calibration. The combline oscillator generates a series of stable harmonic frequency components, which the local oscillator sequentially converts to the same intermediate frequency and the calculated local oscillator frequency and the tune voltage may be stored in local memory.

The approach significantly reduces the recurring costs of VCO's with minimal impact on processor memory and processing time.

For a further detailed description of the inventions, reference should be had to the following description and drawings.

BRIEF DESCRIPTION OF THE DRAWINGS

FIGS. 3A and 3B are an illustration in Psuedo Code of the use of a Cubic Spline best fit polynomial function for linearization and temperature compensation of a VCO tuning characteristic.

DETAILED DESCRIPTION OF THE INVENTIONS

As previously stated, in an ESM receiver combline oscillators are used routinely. It does not constitute additional hardware to use this oscillator to generate known frequencies that may be used to calibrate the VCO, as may be seen by referring to our preferred embodiment illustrated by FIG. 1. In accordance with this embodiment a combline or harmonic oscillator 101 generates a series of stable frequency components which are harmonically related to a base frequency (i.e. Fbase, 2*Fbase, 3*Fbase . . . N*Fbase, where N is a positive integer and Fbase is a fixed frequency).

In accordance with our invention the VCO input voltage is adjusted until a combline signal is down-converted to the center of the IF passband. The input voltage and the computed VCO frequency are recorded in temporary memory. In accordance with the illustrated embodiment, the VCO frequency is computed knowing the combline frequency and the IF center frequency. This procedure is repeated in each repeated calibration for all combline frequencies and a table of voltage/frequency data points is generated.

We have improved the time of calibration by providing that the table of data points is provided as an input to a Cubic Spline program which generates the best fit, third order polynomial curve between each consecutive pair of data points. The output of the Cubic Spline program is a set of four polynomial coefficients for each pair of consecutive data points which can be used to describe the curve between the data points.

The advantage of the described preferred Cubic Spline program over an N-th order polynomial function which might have been used (such as the Lagrange Integration Polynomial) is in the ease of computation and the numerical accuracy. The Lagrange Integration Polynomial requires a polynomial with the same number of elements as the number of data points. Thus, if the combline oscillator has 38 discrete frequencies, a polynomial of degree 38 would need to be solved. This would be too time consuming for the microprocessor and could result in significant error if the coefficients are not carried out to many significant digits, so the Cubic Spline calibration offers a substantial improvement over this other possibility.

Once the Cubic Spline calibration is complete and a particular VCO frequency is desired, the coefficients for the particular frequency range which contains the desired frequency are used to generate a polynomial equation. The equation is solved to determine the corresponding tune voltage. Temperature compensation is achieved by periodically repeating the complete calibration process. The process is repeated when it is determined that the VCO tuning curve has drifted significantly from the previous calibration. The drift is detected by periodically comparing the tune voltages corresponding to the combline frequences to the tune voltages for the same comblines calculated during the previous calibration.

Figure 1:
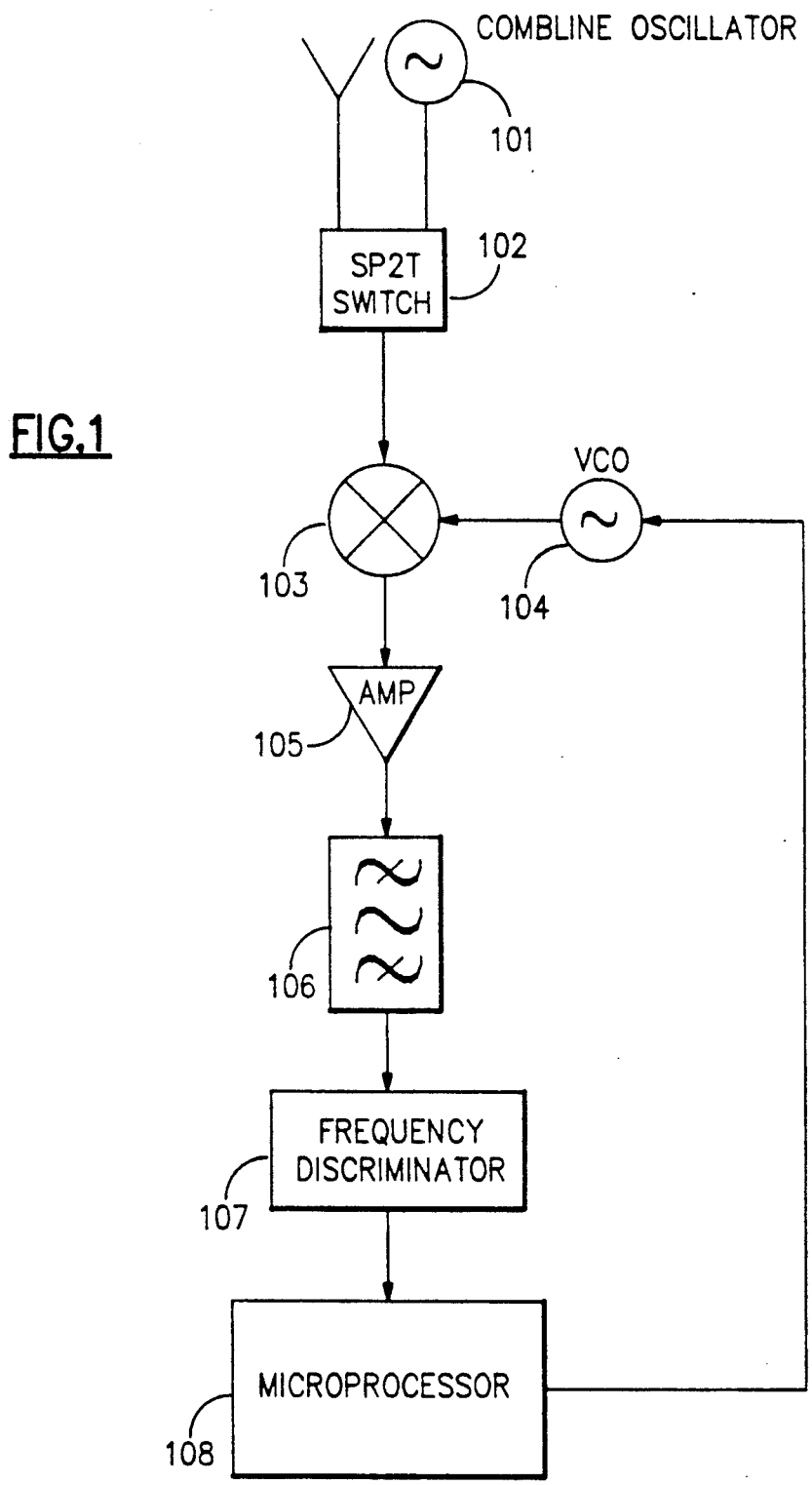
FIG. 1 illustrates schematically an ESM receiver incorporating the preferred embodiment of the inventions.

FIG. 1 illustrates schematically a scanning-superhetrodyne ESM receiver incorporating the preferred embodiment of the inventions. The preferred receiver will comprise a stable combline oscillator (101), a frequency converting device (103), a VCO (104) and a frequency measurement device (107). A VCO (104) will consist of a bipolar or field effect transistor used as a negative resistance element, with a voltage input and frequency output transfer characteristic.

In accordance with our preferred embodiment, we utilize the computational capabilities of the frequency measurement device (107) to compensate for temperature fluctuations. The method of linearizing and compensating for temperature fluctuations which we employ uses the voltage/frequency transfer characteristic of a VCO using a stable combline frequency source to generate known voltage/frequency points. The set of points is input to a Cubic Spline program which creates the coefficients of a set of polynomial curves that together characterize the transfer curve of the VCO as computed by a microprocessor (108). With this method of temperature compensating the VCO transfer curve is determined by repeating the entire calibration procedure periodically whenever the known voltage/frequency points have drifted significantly from a previous calculation.

A preferred scanning superhetrodyne ESM receiver is provided, with the circuit schematically coupled as illustrated in FIG. 1. A single-pole, double throw switch (102) is used to select either the receiver input (usually an antenna) or the combline oscillator (101). During VCO linearization, the switch (102) is connected to the combline oscillator position. The mixer (103), IF amplifier (105), and the bandpass filter (106) are used to convert the combline frequencies to an IF frequency that is measurable by the frequency discriminator (107). The mixer mixes or converts each stable frequency component (N*FBASE) of the combline occilator sequentially to an intermediate frequency (IF) using the VCO (104) as a local oscillator. The frequency discriminator (107) measures the intermediate frequency after amplification. A VCO (104) is provided having a transistor coupled as a negative resistance element and having a voltage input, frequency output transfer characteristic. The VCO may have either a bi-polar or field effect transistor. The VCO (104) is used as the local oscillator input to the mixer (103) and receives its tune voltage command from a microprocessor (108). This microprocessor (108) adjusts the tune voltage input to the VCO such that each combine frequency is sequentially converted to the same intermediate frequency and the calculated local oscillator frequency and tune voltage stored in temporary memory. The local oscillator frequency (Flo) is calculated using the known combline frequency (Fcomb) and the known intermediate frequency (Fif) as Flo=Fcomb-±Fif where the + sign is used if the combline frequency is below the local oscillator frequency and the − sign is used if the combline frequency is above the local oscillator frequency.

Figure 2:
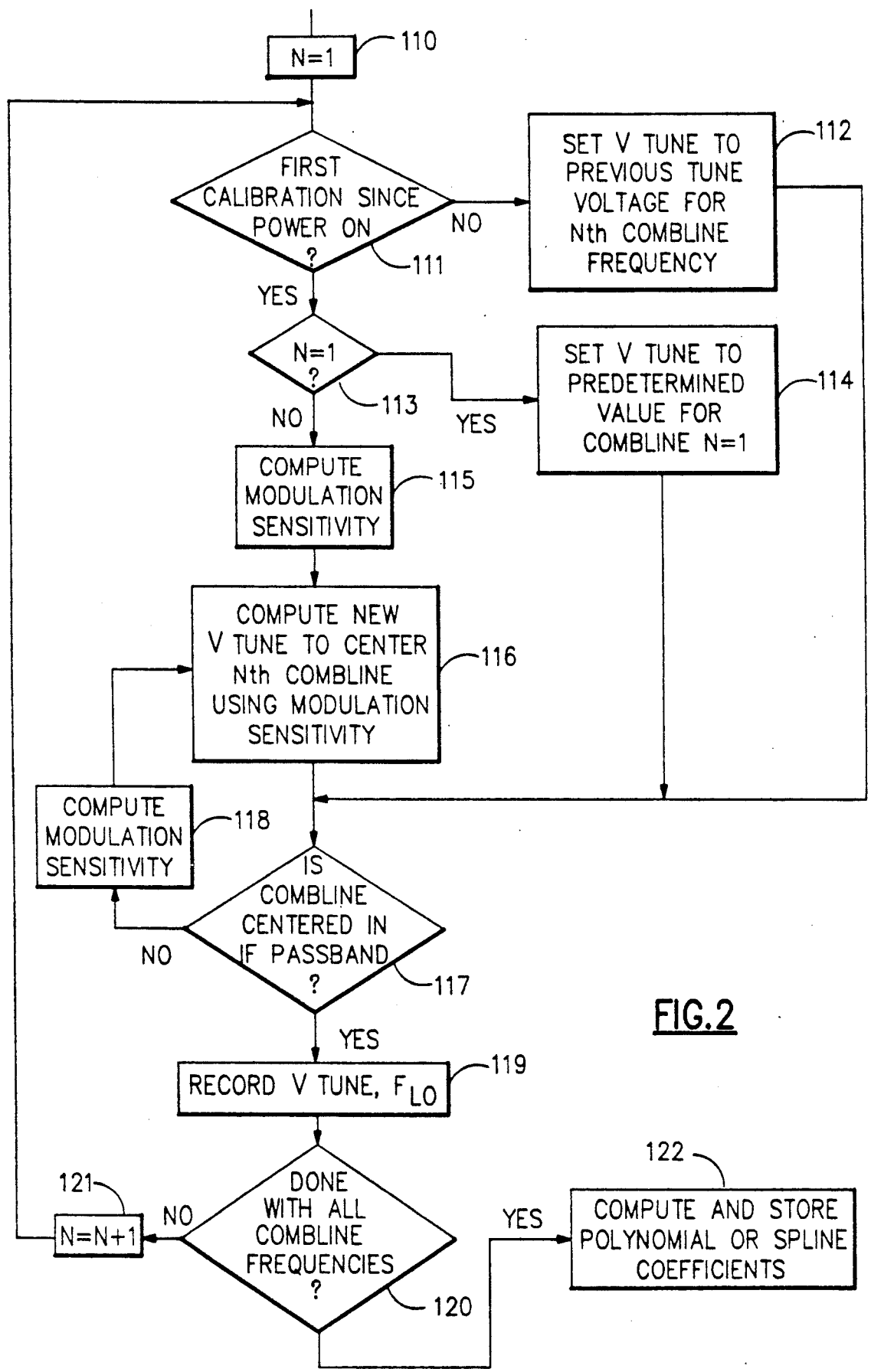
FIG. 2 is a flow chart of the corrective program for the receiver.

FIG. 2 is a flow chart of the corrective program for the receiver. The process starts with power up of the receiver whereupon the microprocessor (108) resets the combline counter to the first combline frequency N=1 (110). The first calibration following receiver power up is different from all subsequent calibrations. During the first calibration, the system must find all the combline frequencies knowing only the tune voltage of the first combline. Once the first calibration is complete and all tune voltages corresponding the combline frequencies are known, all subsequent calibrations use the known combline tune voltages as a starting point for centering the signals in the IF passband. The process (111) decides if the calibration is the first calibration following application of power. If it is, the tune voltage is set to either the predetermined voltage for the first combline (114) if the first combline is being calibrated; or, the modulation sensitivity is computed in process (113) if it is not the first combline frequency. Computing the modulation sensitivity (or slope of the frequency out/voltage in curve) is performed in both process (115) and (118). This process involves recording the tune voltage/frequency output point (V1,F1) then adjusting the tune voltage a fixed amount and recording the second voltage/frequency point (V2,F2). The modulation sensitivity is then computed as (F2−F1)/(V2−V1). Process (116) computes the tune voltage required to center the Nth combline in the IF bandpass. At this point in the program, the microprocessor (108) has attempted to center the Nth combline in the IF passband. Processes (117), (118), and (116) form a repetitive loop wherein the combline signal is adjusted to the center of the IF passband. At this point, the tune voltage/frequency data point may be recorded in process (119). If all combline data points have been taken, the Cubic Spline coefficients are computed and stored in process (122). If the combline frequencies have not been completed, the combline counter is incremented in process (121) and the process is repeated starting at (111).

FIG. 3 is an illustration in pseudo code showing the calculation of the Cubic Spline coefficients (122) using the voltage/frequency points as inputs. As the illustrated code is self explanatory, no further discussion will be needed at this point.

It will be appreciated by those skilled in the art, that having described our preferred embodiment of our inventions, that various improvements and modifications may be made, both now and in the future, and that such modifications will be within the scope of our claimed inventions.

What is claimed is:

1. A scanning-superhetrodyne ESM receiver comprising:

a stable combline source or harmonic oscillator for providing a stable reference signal, a frequency converting device, and a voltage controlled oscillator (VCO), and a frequency measurement device, said frequency converting device converting each stable reference signal component into an intermediate frequency using the voltage controlled as a local oscillator, and said frequency measurement device functions to provide a measure of said intermediate frequency; and wherein said stable reference signal provides a stable combline frequency source to generate a set of known voltage/frequency points, and processor means having a means for providing and storing values in a tempory memory is provided for employing the points as input to an interpolation program of said processor means to create the coefficients of a set of polynomial curves that together characterize the transfer curve of the voltage controlled oscillator, and wherein said processor means is used in a method used during operation for temperature compensating the transfer curve by providing a new set of polynominal coefficients periodically; and wherein the voltage controlled oscillator has a local oscillator frequency calculated using a known combline frequency of said combline or harmonic oscillator and a known intermediate frequency, and wherein there is provided processor means for calculating the value of the equation "local oscillator frequency value=the known combline frequency±the known intermediate frequency", where addition of a known intermediate frequency is used if the combline frequency is below the value of the local oscillator frequency and the known intermediate frequency is subtracted if the combline frequency is above the local oscillator frequency.

2. A scanning-superheterodyne ESM receiver according to claim 1 wherein amplifier means for amplifying an intermediate frequency signal is provided, and wherein said frequency measuring device includes a frequency discriminator for measuring the intermediate frequency after amplification.

3. A scanning-superheterodyne ESM receiver according to claim 1, wherein said combline source or harmonic oscillator generates a series of stable frequency components which are harmonically related to a base frequency, and said frequency converting device includes mixing means for providing each stable frequency component of said combline or harmonic oscillator sequentially as an intermediate frequency using said voltage controlled oscillator as a local oscillator, and said frequency measurement device is provided said intermediate frequency for measurement using a frequency discriminator, and there is provided means for adjusting the voltage controlled oscillator frequency so that each combline or harmonic frequency is sequentially converted to the same intermediate frequency and wherein a tune voltage value is provided and said local oscillator frequency and said tune voltage are stored in a temporary memory.

4. A scanning-superheterodyne ESM receiver according to claim 1 wherein the voltage controlled oscillator includes a control circuit for correction of tuning curve non-linearities.

5. A scanning-superheterodyne ESM receiver according to claim 1 wherein the voltage controlled oscillator has a local control circuit for correction of tuning curve non-linearities.

6. A scanning-superheterodyne ESM receiver according to claim 1 wherein said processor means has means for adjusting the voltage controlled oscillator frequency so that each combline or harmonic frequency is sequentially converted to the same intermediate frequency and the tune voltage store values are provided, and wherein local oscillator frequency store values and tune voltage store values are stored in said temporary memory.

7. A scanning-superheterodyne ESM receiver according to claim 6 wherein said processor means employs a set of stored value points of voltage/frequency as an input to an interpolation program of said processor to provide the coefficients of a set of polynomial curves that together characterize the transfer curve of said voltage controlled oscillator, and said processor means is coupled to said voltage controlled oscillator to provide a tune voltage input correction thereto.

8. A scanning-superheterodyne ESM receiver according to claim 6 Wherein said processor means provides a temperature compensating adjustment for said voltage controlled oscillator by repeating periodically a calibration procedure during operation of said receiver.

9. A scanning-superhetrodyne receiver comprising:

a stable oscillator for providing a stable reference source signal, a frequency converting device, and a voltage controlled oscillator (VCO), and a frequency measurement device, said frequency converting device converting each stable oscillator reference signal component into an intermediate frequency using the voltage controlled oscillator as a local oscillator, and said frequency measurement device functioning to provide a measure of said intermediate frequency, and wherein the voltage controlled oscillator has a local oscillator frequency calculated using a known source frequency of said stable oscillator and a known intermediate frequency, and wherein there is provided processor means for calculating the value of the equation "local oscillator frequency value=the known source frequency±the known intermediate frequency", where addition of a known intermediate frequency is used if the source frequency is below the value of the local oscillator frequency and the known intermediate frequency is subtracted if the source is above the local oscillator frequency.

10. A scanning-superheterodyne receiver according to claim 9 wherein said frequency converting device includes a mixer means for said known source frequency of said stable oscillator and a known intermediate frequency, an intermediate frequency amplifier, and a bandpass filter, and said frequency measuring device includes a frequency discriminator for measuring the intermediate frequency after amplification.

11. A scanning-superheterodyne receiver according to claim 9 wherein
   a said stable reference signal provides a frequency source for generating a set of known voltage/frequency points, and
   said processor means provides the points as input to an interpolation program of said processor means to create the coefficients of a set of polynomial curves that together characterize the transfer curve of the voltage controlled oscillator.

12. A scanning-superheterodyne receiver according to claim 11 where said processor means is enabled during operation for temperature compensating the voltage controlled oscillator transfer curve by providing a new set of polynomial coefficients periodically.

13. A scanning-superheterodyne receiver according to claim 9, wherein said processor means has a temporary memory, and said stable oscillator generates a source frequency signal as a source of a series of stable frequency components which are harmonically related to a base frequency, and said frequency converting device includes mixing means for providing each stable frequency component of said stable oscillator sequentially as an intermediate frequency using said voltage controlled oscillator as a local oscillator, and said frequency measurement device is provided said intermediate frequency for measurement using a frequency discriminator, and there is provided means for adjusting the voltage controlled oscillator frequency so that said source frequency signal is sequentially converted to an intermediate frequency and wherein a tune voltage value is provided and said local oscillator frequency and said tune voltage are stored in said temporary memory.

14. A scanning-superheterodyne receiver according to claim 9 wherein the voltage controlled oscillator includes a control circuit for correction of tuning curve non-linearities.

15. A scanning-superheterodyne receiver according to claim 12 wherein the voltage controlled oscillator has a local control circuit for correction of tuning curve non-linearities.

16. A scanning-superheterodyne receiver according to claim 9 wherein said processor means has a temporary memory and provides for adjusting the voltage controlled oscillator frequency so that each source frequency is sequentially converted to the same intermediate frequency and the tune voltage store values are provided, and wherein local oscillator frequency store values and tune voltage store values are stored in said temporary memory.

17. A scanning-superheterodyne ESM receiver according to claim 16 wherein said processor means employs a set of stored value points of voltage/frequency as an input to an interpolation program of said processor to provide the coefficients of a set of polynomial curves that together characterize the transfer curve of said voltage controlled oscillator, and said processor means is coupled to said voltage controlled oscillator to provide a tune voltage input correction thereto.

18. A scanning-superheterodyne receiver according to claim 16 wherein said processor means provides a temperature compensating adjustment for said voltage controlled oscillator by repeating periodically a calibration procedure during operation of said receiver.

19. A scanning-superheterodyne receiver according to claim 9 wherein said stable oscillator for providing a source reference signal is a combline or harmonic oscillator.

* * * * *